US009036602B2

(12) United States Patent (10) Patent No.: US 9,036,602 B2
Chen et al. (45) Date of Patent: May 19, 2015

(54) METHOD, DEVICE, AND SYSTEM FOR OPTIMIZING RADIO NETWORK

(71) Applicant: HUAWEI TECHNOLOGIES CO., LTD., Shenzhen, Guangdong (CN)

(72) Inventors: Jie Chen, Shenzhen (CN); Hongcheng Zhuang, Shenzhen (CN); Andrian Beletchi, Guangdong (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 155 days.

(21) Appl. No.: 13/718,461

(22) Filed: Dec. 18, 2012

(65) Prior Publication Data

US 2013/0223403 A1 Aug. 29, 2013

Related U.S. Application Data

(63) Continuation of application No. PCT/CN2012/076066, filed on May 25, 2012.

(30) Foreign Application Priority Data

Feb. 24, 2012 (CN) .......................... 2012 1 0044358

(51) Int. Cl.
*H04W 4/00* (2009.01)
*H04W 36/24* (2009.01)
*H04W 36/00* (2009.01)

(52) U.S. Cl.
CPC .......... *H04W 36/24* (2013.01); *H04W 36/0083* (2013.01)

(58) Field of Classification Search
CPC .......................... H04W 36/0083; H04W 36/24
See application file for complete search history.

(56) References Cited

U.S. PATENT DOCUMENTS

2005/0215254 A1 9/2005 Pedersen et al.
2008/0220784 A1 9/2008 Somasundaram et al.
(Continued)

FOREIGN PATENT DOCUMENTS

CN 101854684 A 10/2010
CN 102209338 A 10/2011
WO WO 2009/123512 A1 10/2009

OTHER PUBLICATIONS

Giorgio Calarco, et al., "Virtual Networks and Software Router approach for Wireless Emergency Networks Design", IEEE 2011, 5 pages.

(Continued)

*Primary Examiner* — David Oveissi
(74) *Attorney, Agent, or Firm* — Huawei Technologies Co., Ltd

(57) ABSTRACT

The present invention provides a method, a device, and a system for optimizing a radio network. The method provided in the present invention includes: recognizing a terminal that needs optimization processing; according to a degree of influencing a network handover performance indicator or network load performance indicator by each terminal that needs optimization processing, performing handover priority sorting on the terminal that needs optimization processing to obtain a sorted handover priority result; according to the sorted handover priority result, and based on a configuration rule that a smaller handover parameter value is configured for a terminal with a higher handover priority, configuring a handover parameter for the terminal that needs optimization processing; and sending the handover parameter to a corresponding terminal.

3 Claims, 12 Drawing Sheets

(56) References Cited

U.S. PATENT DOCUMENTS

| | | | |
|---|---|---|---|
| 2009/0323638 A1* | 12/2009 | Catovic et al. | 370/331 |
| 2010/0234027 A1* | 9/2010 | Han et al. | 455/436 |
| 2011/0026492 A1 | 2/2011 | Frenger et al. | |
| 2012/0149378 A1* | 6/2012 | Li et al. | 455/438 |

OTHER PUBLICATIONS

"3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3GPP TR 36.902 v9.3.1, Mar. 2011, 21 pages.

International Search Report and Written Opinion of the International Searching Authority dated Feb. 24, 2012 in connection with International Patent Application No. PCT/CN2012/076066.

NGMN: "NGMN Recommendation on son & O & M requirements", XP050335477, Dec. 2008, total 40 pages.

* cited by examiner

METHOD, DEVICE, AND SYSTEM FOR OPTIMIZING RADIO NETWORK

CROSS-REFERENCE TO RELATED APPLICATIONS

This application is a continuation of International Application No. PCT/CN2012/076066, filed on May 25, 2012, which claims priority to Chinese Patent Application No. 201210044358.5, filed with the Chinese Patent Office on Feb. 24, 2012, both of which are hereby incorporated by reference in their entireties.

TECHNICAL FIELD

The present invention relates to the communications field, and in particular, to a method, a device, and a system for optimizing a radio network.

BACKGROUND

In 3GPP (The 3rd Generation Partnership Project) standards, an intense research has been made on SON (Self-Organizing Network, self-organizing setwork) which serves as an important feature of LTE. Two important functions of the SON technology are MRO (Mobility Robustness Optimization, mobility robustness optimization) and MLB (Mobility Load Balancing, mobility load balancing). The main objective of MRO is to reduce problems caused by a handover of a terminal as many as possible in order to improve a network handover performance indicator; and the main objective of MLB is to solve unbalanced load state among cells in order to improve a network load performance indicator. Main adjusted parameters in MRO and MLB are handover parameters, which include a Hysteresis (handover hysteresis) parameter, a TTT (Time-To-Trigger, handover time-to-trigger) parameter, and a CIO (Cell Individual Offset, handover offset) parameter.

During the implementation of the present invention, the inventor finds that the prior art has the following problems:

A base station configures a handover parameter by using a cell as a configuration object, that is, the base station configures the same handover parameter for all terminals in one same cell. The handover parameter obtained by using such a parameter configuration method is not accurate enough, resulting in that terminals that do not need an inter-cell handover also meet a handover measurement condition and are thus handed over to a neighboring cell, thereby causing a waste of network resources.

SUMMARY

Embodiments of the present invention provide a method, a device, and a system for optimizing a radio network, capable of configuring a handover parameter for a single terminal and enhancing the accuracy of the handover parameter configured for each terminal, thereby avoiding the problem of wasting network resources.

To meet the preceding purpose, embodiments of the present invention use the following technical solutions:

On one hand, an embodiment of the present invention provides a method for optimizing a radio network, which includes:

recognizing a terminal that needs optimization processing, where the terminal that needs optimization processing at least includes a terminal causing that a network handover performance indicator is higher than a corresponding preset value, or a terminal causing that a network load performance indicator is higher than a corresponding preset value;

according to a degree of influencing the network handover performance indicator or network load performance indicator by each terminal that needs optimization processing, performing handover priority sorting on the terminal that needs optimization processing to obtain a sorted handover priority result, where the terminal that has a greater degree of influencing the network handover performance indicator or network load performance indicator has a higher handover priority;

according to the sorted handover priority result, and based on a configuration rule that a smaller handover parameter value is configured for a terminal with a higher handover priority, configuring a handover parameter for the terminal that needs optimization processing; and sending the handover parameter to a corresponding terminal, so that the terminal is handed over according to the handover parameter to complete optimization processing.

On another hand, an embodiment of the present invention further provides a device for optimizing a radio network, which includes:

a terminal recognition unit, adapted to recognize a terminal that needs optimization processing, where the terminal that needs optimization processing at least includes a terminal causing that a network handover performance indicator is higher than a corresponding preset value, or a terminal causing that a network load performance indicator is higher than a corresponding preset value;

a handover priority sorting unit, adapted to, according to a degree of influencing the network handover performance indicator or network load performance indicator by each terminal that needs optimization processing, perform handover priority sorting on the terminal that needs optimization processing to obtain a sorted handover priority result, where the terminal that has a greater degree of influencing the network handover performance indicator or network load performance indicator has a higher handover priority;

a handover parameter configuration unit, adapted to, according to the sorted handover priority result, and based on a configuration rule that a smaller handover parameter value is configured for a terminal with a higher handover priority, configure a handover parameter for the terminal that needs optimization processing; and a handover parameter sending unit, adapted to send the handover parameter to the corresponding terminal, so that the terminal is handed over according to the handover parameter to complete optimization processing.

On yet another hand, an embodiment of the present invention further provides a communication system, capable of optimizing a radio network, and the communication system includes a base station and at least one terminal; the base station includes the device for optimizing a radio network, which is adapted to recognize a terminal that needs optimization processing, where the terminal that needs optimization processing at least includes a terminal causing that a network handover performance indicator is higher than a corresponding preset value, or a terminal causing that a network load performance indicator is higher than a corresponding preset value; according to a degree of influencing the network handover performance indicator or network load performance indicator by each terminal that needs optimization processing, perform handover priority sorting on the terminal that needs optimization processing to obtain a sorted handover priority result, where the terminal that has a greater degree of influencing the network handover performance indicator or network load performance indicator has a higher handover priority; according to the sorted handover priority result, and based on a configuration rule that a smaller handover parameter value is configured for a terminal with a higher handover priority, configure a handover parameter for the terminal that needs optimization processing; and send the handover parameter to the corresponding terminal, so that the terminal is handed over according to the handover parameter to complete optimization processing; the terminal is adapted to receive the handover parameter configured by the base station, and is handed over according to the handover parameter to complete optimization processing.

The method, device, and system for optimizing a radio network provided in the embodiments of the present invention are capable of recognizing a terminal that needs optimization processing in a current cell, and configuring a handover parameter for each terminal according to a specific situation of each terminal causing that a network handover performance indicator and a network load performance indicator of the current cell deteriorate, so that a terminal that needs a handover is handed over to a neighboring cell for communication and a terminal that does not need a handover is kept in a source serving cell for communication, so as to avoid some unnecessary inter-cell handovers and avoid a waste of radio resources, and at the same time further enhance the quality of service of the current cell.

BRIEF DESCRIPTION OF THE DRAWINGS

To illustrate the technical solutions in the embodiments of the present invention or in the prior art more clearly, the accompanying drawings needed for describing the embodiments or the prior art are introduced below briefly. Apparently, the accompanying drawings in the following descriptions merely show some of the embodiments of the present invention, and persons skilled in the art may obtain other drawings according to the accompanying drawings without creative efforts.

DETAILED DESCRIPTION

The technical solutions of the embodiments of the present invention are hereinafter described clearly with reference to the accompanying drawings in the embodiments of the present invention. Evidently, the described embodiments are some exemplary embodiments of the present invention, rather than all embodiments of the present invention. All other embodiments obtained by persons skilled in the art based on the embodiments of the present invention without creative efforts shall fall within the protection scope of the present invention.

Embodiment 1

Figure 1:
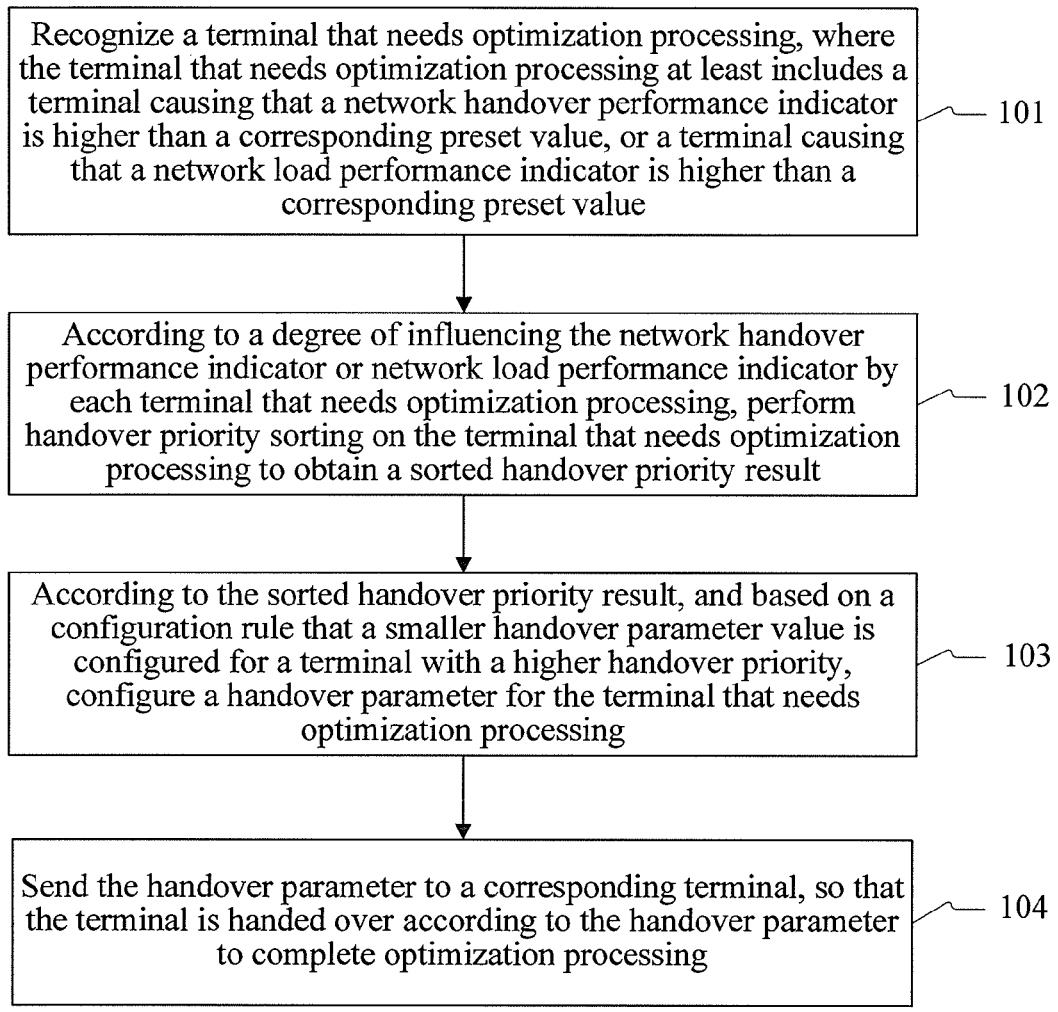
FIG. 1 is a schematic flow chart of a method for optimizing a radio network provided in Embodiment 1 of the present invention.

An embodiment of the present invention provides a method for optimizing a radio network, and as shown in FIG. 1, the method includes:

101. Recognize a terminal that needs optimization processing, where the terminal that needs optimization processing at least includes a terminal causing that a network handover performance indicator is higher than a corresponding preset value, or a terminal causing that a network load performance indicator is higher than a corresponding preset value.

It should be noted that the method provided in the embodiment of the present invention may be implemented by a base station in a communication system, but the present invention is not limited thereto.

102. According to a degree of influencing the network handover performance indicator or network load performance indicator by each terminal that needs optimization processing, perform handover priority sorting on the terminal that needs optimization processing to obtain a sorted handover priority result, where the terminal that has a greater degree of influence on the network handover performance indicator or network load performance indicator has a higher handover priority.

Specifically, the base station may perform handover priority sorting on the terminal that needs optimization processing according to a deterioration situation of the network handover performance indicator and a deterioration situation of the network load performance indicator of a current cell.

103. According to the sorted handover priority result, and based on a configuration rule that a smaller handover parameter value is configured for a terminal with a higher handover priority, configure a handover parameter for the terminal that needs optimization processing.

In an embodiment, the base station configures a different handover parameter value for each terminal that needs optimization processing. That is, if some terminals have different handover priorities, the base station configures different handover parameter values for these terminals; and if some terminals have the same handover priority, the base station might configure the same handover parameter for these terminals.

In another embodiment, the base station may configure different handover parameters for different terminals according to measurement information reported by each terminal. The handover parameter includes, but is not limited to: a CIO parameter, a TTT parameter, and a Hysteresis parameter. Furthermore, when the base station configures the same handover parameter for different terminals, different parameter values may be configured for the handover parameter of each terminal, thereby improving the accuracy of configuring handover parameters for terminals, so that a terminal that needs a handover is handed over to a neighboring cell for communication and a terminal that does not needs a handover is kept in a source serving cell for communication.

104. Send the handover parameter to a corresponding terminal, so that the terminal is handed over according to the handover parameter to complete optimization processing.

By configuring a handover parameter for a terminal that needs optimization processing, a terminal that causes the quality deterioration of a current cell network is handed over to a neighboring cell, so as to improve the network handover performance indicator and network load performance indicator of the current cell.

The method for optimizing a radio network provided in the embodiment of the present invention can recognize a terminal that needs optimization processing in a current cell, and according to a specific situation of each terminal causing that a network handover performance indicator and a network load performance indicator of the current cell deteriorate, configure a handover parameter for each terminal, so that a terminal that needs a handover is handed over to a neighboring cell for communication and a terminal that does not need a handover is kept in a source serving cell for communication, so as to avoid some unnecessary inter-cell handovers and avoid a waste of radio resources, and at the same time further enhance the quality of service of the current cell.

Embodiment 2

Figure 2A:
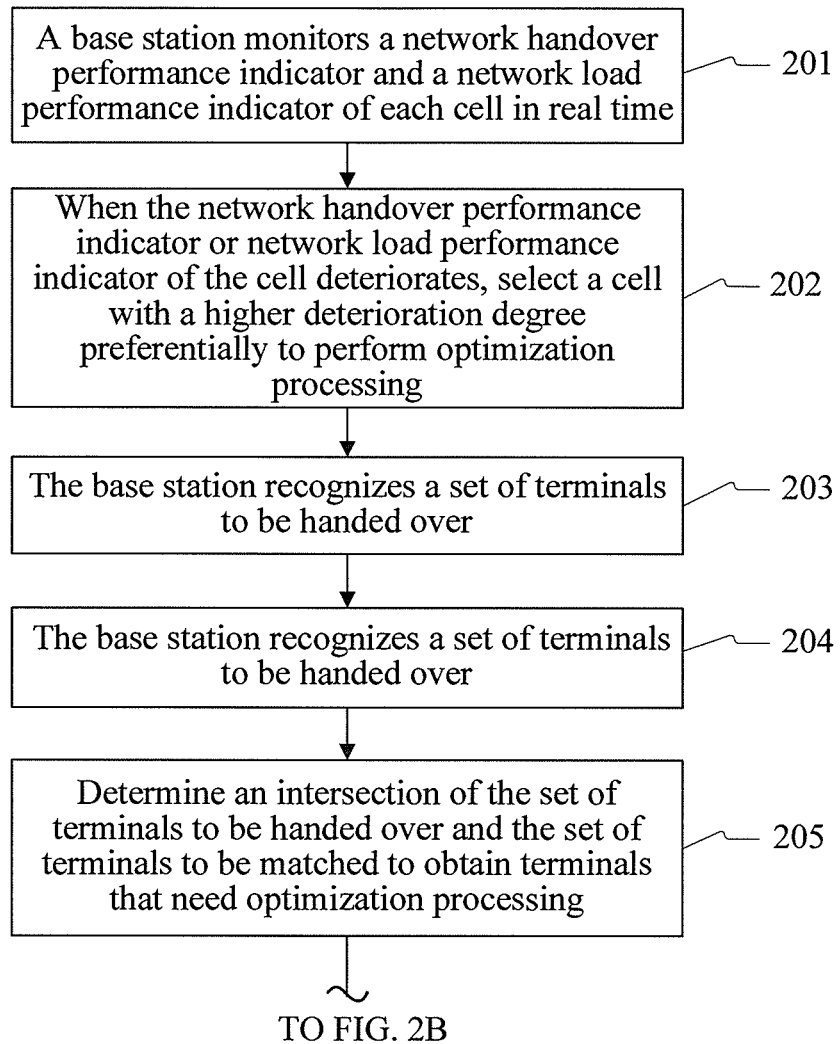
FIGS. 2A and 2B are schematic flow charts of a method for optimizing a radio network provided in Embodiment 2 of the present invention.
Figure 2B:
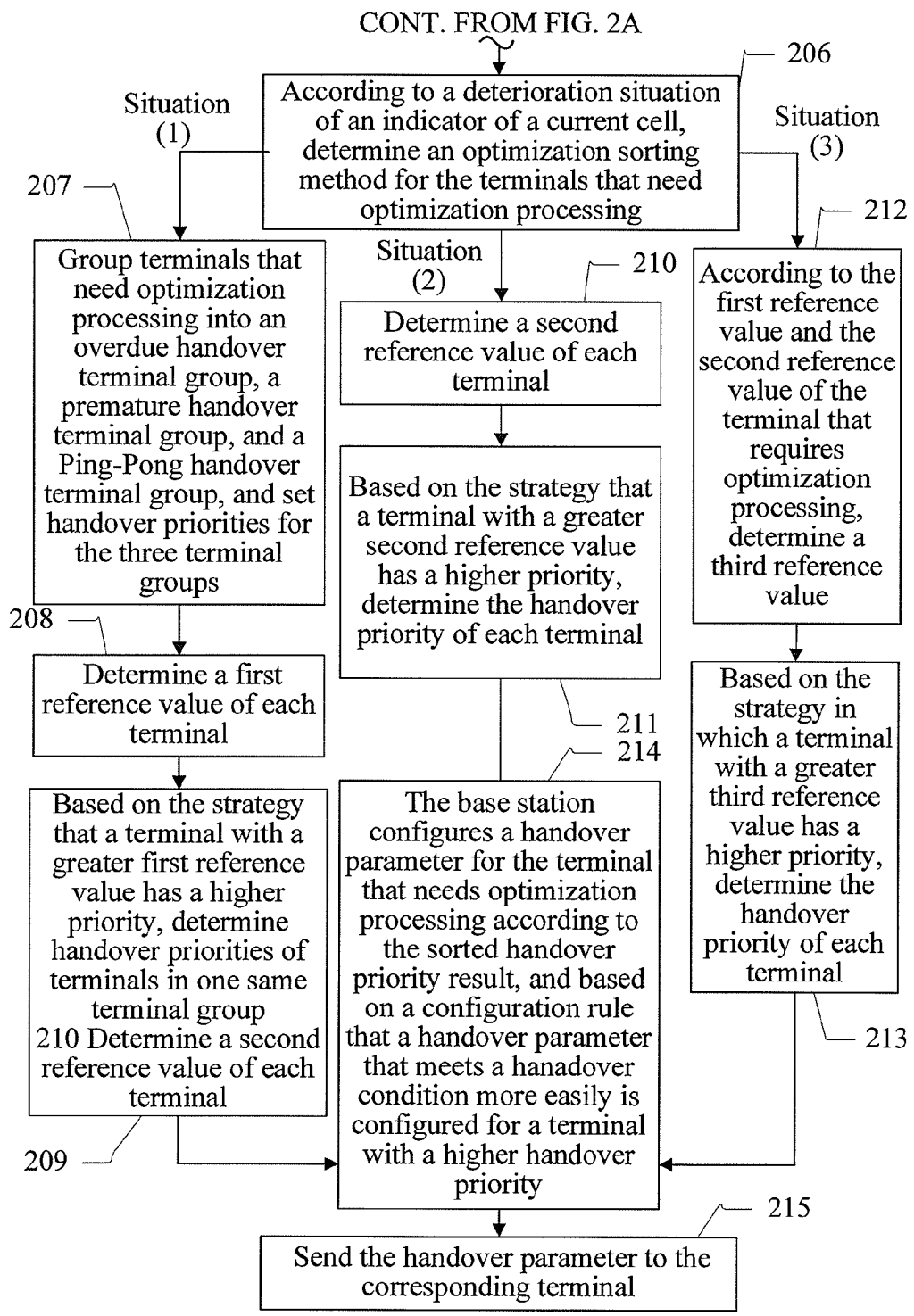

An embodiment of the present invention provides a method for optimizing a radio network, and as shown in FIG. 2, the method includes:

201. A base station monitors a network handover performance indicator and a network load performance indicator of each cell in real time.

Specifically, the factor that influences a network handover performance indicator of a cell includes a HOF (Handover Failure Ratio, handover failure ratio) and an HPP (Ping-Pong Handover Ratio, Ping-Pong handover ratio), of a terminal in a cell, and so on; and the factor that influences a network load ratio of a cell includes a CDR (Call Dropping Ratio, cell dropping ratio) and the number of unsatisfied users (marked as z) in a cell, and so on.

202. When the network handover performance indicator or network load performance indicator of the cell deteriorates, select a cell with a higher deterioration degree preferentially to perform optimization processing.

It should be noted that a corresponding threshold is preset in a communication system for determination for a network handover performance indicator and a network load performance indicator of a cell; when the network handover performance indicator or the network load performance indicator of a cell is higher than the corresponding threshold, it is regarded that the network handover performance indicator or network load performance indicator of the cell deteriorates.

Specifically, a base station may count a Unified KPI (Unified Key Performance Indicator unified key performance indicate) value of a cell within a count period n in a communication system to determine a deterioration degree of the network handover performance indicator or the network load performance indicator of each cell, so as to determine a cell with the highest deterioration degree and perform optimization processing on the cell preferentially. The Unified KPI value is also used for representing a deterioration degree of a cell by taking the network handover performance indicator and network load performance indicator in the cell into consideration.

An embodiment of the present invention provides a method for calculating a cell Unified KPI value, as shown in Formula (1):

$$\text{Unified KPI}_{i,n} = \lambda_1 \text{HOF}_{i,n} + \lambda_2 \text{HPP}_{i,n} + \lambda_3 \text{CDR}_{i,n} + \lambda_4 z_{i,n} \quad (1)$$

$\text{HOF}_{i,n}$ is a handover failure ratio of a cell i within a count period n, $\lambda_1$ is the weight of $\text{HOF}_{i,n}$; $\text{HPP}_{i,n}$ is a Ping-Pong handover ratio of the cell i within the count period n, $\lambda_2$ is the weight of $\text{HPP}_{i,n}$; $\text{CDR}_{i,n}$ is a dropping ratio of the cell i within the count period n, $\lambda_3$ is the weight of $\text{CDR}_{i,n}$; $z_{i,n}$ is the number of unsatisfied users within the count period n of the cell i, $\lambda_4$ is the weight of $z_{i,n}$; and the values of these weights depend on the strategy and preference of a carrier for the Unified KPI. After the Unified KPI value of each cell is obtained by determining weight values according to the strategy of the carrier, the cells are sorted by decreasing Unified KPI values that are obtained, so as to determine an order of performing optimization processing on problematic cells in a network covered by a current base station.

Specifically, the base station can count the Unified KPI value of each cell within a preset count period to determine a problematic cell where a network handover performance indicator or a network load performance indicator deteriorates. Exemplarily, to guarantee the accuracy of sorting problematic cells in a network, the following method may be adopted: if the network handover performance indicator or the network load performance indicator of a cell counted within an $n^{th}$ count period is higher than a corresponding preset threshold, with the $n^{th}$ count period being a start period, the network handover performance indicator and the network load performance indicator of the cell are counted within m consecutive count periods, a cell whose network handover performance indicator or network load performance indicator is higher than the corresponding preset value within the m consecutive count periods is determined as a problematic cell that needs optimization processing, and problematic cells are sorted by decreasing Unified KPI values within them consecutive count periods to determine an order of performing optimization processing on the problematic cells in the network.

The base station performs optimization processing on the problematic cells by using the same method and the only difference is about a processing order. For ease of understanding, the optimization processing of a current cell is taken as an example for illustration in the following in the embodiments of the present invention.

203. The base station recognizes all terminals in an overlapped area between the current cell and a neighboring cell, in which the terminals are seen as a set of terminals to be handed over.

204. Count a network handover performance indicator and a network load performance indicator of the current cell within a count period, and recognize, from the terminals of the current cell, a terminal causing that the network handover performance indicator or network load performance indicator of the current cell is higher than a corresponding preset threshold, where terminals that are recognized are seen as a set of terminals to be matched.

Exemplarily, if the network handover performance indicator or network load performance indicator of the current cell counted within the $n^{th}$ count period is higher than the corresponding preset threshold, with the $n^{th}$ count period being a start period, the network handover performance indicator and the network load performance indicator of the current cell are counted within m consecutive count periods; when the network handover performance indicator or the network load performance indicator of the current cell counted within the m consecutive count periods is higher than the corresponding preset threshold, at least one count period is chosen, and within the chosen count period, a terminal causing that the network handover performance indicator or network load performance indicator is higher than the corresponding preset threshold is recognized from the terminals of the current cell for a set of terminals to be matched, where n and m are preset values in the system and are positive integers, and the preset values are variable.

On one hand, when the network handover performance indicator of the current cell is higher than the corresponding preset value, the following method may be adopted to obtain the set of terminals to be matched:

Within a chosen count period, according to signaling count information of the network, a terminal on which a handover problem occurs is recognized in the current cell, and a set of terminals on which a handover problem occurs is determined as a set of terminals to be matched. The signaling count information of the network is obtained by reading and counting signaling capable of recognizing every handover problem of a corresponding terminal in a network and is used for representing or recording a handover problem that occurs during the handover of the terminal. The handover problem includes an overdue handover, a premature handover, a Ping-Pong handover, and the like.

Specifically, the base station may determine an overdue handover terminal, a premature handover terminal, and a Ping-Pong handover terminal that are in a current cell according to RRC (Radio Resource Control, radio resource control) signaling sent by the terminal, and the specific implementation method is as follows:

Within the chosen count period n, if a source cell GCI (Global Cellular Identity, global cellular identity) in a received RRC Connection Reestablishment Request (connection reestablishment request) message sent by a terminal 1 is different from a current cell GCI, and the cause for reestablishment is a Handover failure (handover failure) and at the same time Context (context) information of the current cell does not include the terminal 1, the terminal 1 is determined as an overdue handover terminal.

Within the chosen count period n, if a source cell GCI in a received RRC connection reestablishment request message sent by a terminal 2 is the same as the current cell GCI, and the cause for the reestablishment is a Handover failure and at the same time Context information of the current cell includes the terminal 2, the terminal 2 is determined as a premature handover terminal.

Within the chosen count period n, latest stayed two pieces of cell information in history information (history information) in a Handover request (handover request) message sent by a terminal 3 are received, if in the two pieces of cell information the GCI of a former cell is the same as that of the current cell and the stay duration in a latter cell is smaller than a preset Ping-Pong duration threshold, terminal 3 is determined as a Ping-Pong handover terminal.

Apparently, the terminal 1, the terminal 2, and the terminal 3 denote the same type of terminal rather than a specific terminal.

On the other hand, when the network load performance indicator of the current cell is higher than the corresponding preset value, the following method may be adopted to obtain a set of terminals to be matched:

Within a chosen count period, the number of PRBs (Physical Resource Blocks, physical resource blocks) occupied by each terminal in the current cell is counted; and based on a descending order of the numbers of PRBs, terminals are selected from terminals that need optimization processing and labeled in sequence, until the total number of the PRBs occupied by the labeled terminals reaches the highest value in the range of the preset number of PRBs, and the labeled terminals are used as a set of terminals to be matched.

205. The base station determines an intersection of the set of terminals to be handed over and the set of terminals to be matched to obtain terminals that need optimization processing.

It should be noted that an implementation method of determining, from the terminals of the current cell, a terminal that needs optimization processing is described in steps 203 to 205. In addition, an embodiment of the present invention further provides another simpler implementation method, which is specifically as follows:

(1) Recognize all terminals in an overlapped area between a current cell and a neighboring cell as a set of terminals to be handed over.

(2) Count a network handover performance indicator and a network load performance indicator of a current cell within a preset count period; if the network handover performance indicator or the network load performance indicator of the current cell counted within the $n^{th}$ count period is higher than the corresponding preset threshold, a network handover performance indicator and a network load performance indicator of a current cell within m consecutive count periods are counted with the $n^{th}$ count period being a start period; when the network handover performance indicator or the network load performance indicator counted within the m consecutive count periods is higher than the corresponding preset threshold, at least one count period is chosen, and within the chosen count period, a terminal causing that the network handover performance indicator or the network load performance indicator of the current cell is higher than the corresponding preset threshold is recognized from the determined set of terminals to be handed over as a terminal that needs optimization processing, where n and m are preset values in the system and the preset values are variable; m and n are positive integers.

Compared with the method provided in steps 203 to 205, the method directly determines, from the set of terminals to be handed over, a terminal that needs optimization processing, without having to perform the operation of taking an intersection in step 205.

206. According to a deterioration situation of an indicator of a current cell, determine an optimization sorting method for the terminals that need optimization processing.

Specifically, the deterioration situation of an indicator of a current cell includes the following three: (1) only a network handover performance indicator is higher than a corresponding preset value; (2) only a network load handover indicator is higher than a corresponding preset value; (3) both a network handover performance indicator and a network load performance indicator are higher than corresponding preset values.

If the deterioration situation of an indicator of a current cell is (1), execute step 207; if the deterioration situation of an indicator of a current cell is (2), execute step 210; and if the deterioration situation of an indicator of a current cell is (3), execute step 212.

207. Group terminals that need optimization processing into an overdue handover terminal group, a premature handover terminal group, and a Ping-Pong handover terminal group, and set handover priorities for the three terminal groups.

Specifically, overdue handover terminals determined in step 204 are grouped as an overdue handover terminal group, determined premature handover terminals are grouped as a premature handover terminal group, and determined Ping-Pong handover terminals are grouped as a Ping-Pong handover terminal group; and the priority of the overdue handover terminal group is set higher than the priorities of the premature handover terminal group and the Ping-Pong handover terminal group, and the priority of the premature handover terminal group is set higher than the priority of the Ping-Pong handover terminal group, that is, the handover priority of the overdue handover terminal>the handover priority of the premature handover terminal>the handover priority of the Ping-Pong handover terminal.

208. According to the number of times that the handover problem occurs on each terminal within a specified count period n, and a difference value ΔRSRP value, which is measured by each terminal, between an RSRP (Reference Signal Receiving Power, reference signal receiving power) value of a current cell and an RSRP value of a neighboring cell, determine a first reference value of each terminal; where the first reference value is used for representing a handover priority of the terminal when only the network load performance indicator deteriorates (that is, the network only needs the handover priority of each terminal during MRO optimization), where the handover problem includes an overdue handover, a premature handover, a Ping-Pong handover, and the like.

209. Based on the strategy that a terminal with a greater first reference value has a higher priority, further sort terminals in one same terminal group, and determine handover priorities of the terminals in one same terminal group.

An embodiment of the present invention provides a method for calculating a first reference value for reference, as shown in Formula (2), the first reference value is marked as $P_{UE_k}^{MRO}$:

$$P_{UE_k}^{MRO} = \alpha l_{UE_k} + (1-\alpha) M'_{i,UE_k}; \qquad (2)$$

in which, $$l_{UE_k} = \frac{w_{too\text{-}late} l_{UE_k\text{-}too\text{-}late} + w_{too\text{-}early} l_{UE_k\text{-}too\text{-}early} + w_{ping\text{-}pong} l_{UE_k\text{-}ping\text{-}pong}}{w_{too\text{-}late} + w_{too\text{-}early} + w_{ping\text{-}pong}},$$

denotes the normalization of the number of times that the handover problem occurs on a terminal k within the chosen count period; specifically, $l_{UE_k\text{-}too\text{-}late}$ denotes the number of times that an overdue handover occurs on the terminal k, $w_{too\text{-}late}$ denotes the weight that an overdue handover occurs on the terminal k; $l_{UE_k\text{-}too\text{-}early}$ denotes the number of times that a premature handover occurs on the terminal k, $w_{too\text{-}early}$ denotes the weight that a premature handover occurs on the terminal k; $l_{UE_k\text{-}ping\text{-}pong}$ denotes the number of times that a Ping-Pong handover occurs on the terminal k, and $w_{ping\text{-}pong}$ denotes the weight that a Ping-Pong handover occurs on the terminal k;

$M'_{i,UE_k} = \gamma_1 (M_{i,UE_k} - M_{0,UE_k}) + \gamma_2$ denotes the normalization of an RSRP incremental value when the terminal k is connected to a neighboring cell i from a serving cell: in which $M_{0,UE_k}$ is the RSRP value of a serving cell 0 measured by the terminal k, is the RSRP value of the neighboring cell i measured by $UE_k$, $\gamma_1$ and $\gamma_2$ denote coefficients, and $\gamma_1$ and $\gamma_2$ are preset by the communication system.

According to the description in step 209, apparently, a terminal with a greater $P_{UE_k}^{MRO}$ a higher handover priority.

210. Within the chosen count period n, according to the number of PRBs occupied by the terminal that needs optimization in the serving cell, the total number of PRBs of the serving cell, the number of PRBs needed for a handover to a neighboring cell, and the total number of PRBs of the neighboring cell of the handover, determine a second reference value of each terminal, where the second reference value is used for representing a handover priority of the terminal when only the network load performance indicator deteriorates (that is, the network only needs the handover priority of each terminal during MLB optimization).

211. Based on the strategy that a terminal with a greater second reference value has a higher priority, perform handover priority sorting on the terminals that need optimization, and determine the handover priority of each terminal.

An embodiment of the present invention provides a method for calculating a second reference value for reference, and as shown in Formula (3), the second reference value is marked as $P_{UE_k}^{MLB}$:

$$P_{UE_k}^{MLB} = \zeta_1 \left( \frac{N_{0,UE_k}}{M_{PRB_0}} - \frac{N_{i,UE_k}}{M_{PRB_i}} \right) + \xi_2 \qquad (3)$$

in which $N_{0,UE_k}$ is the number of PRBs used by the terminal k in the serving cell 0, $M_{PRB_0}$ is the total number of PRBs of the serving cell 0; $N_{i,UE_k}$ is the number of PRBs needed for the terminal k in the neighboring cell i; $M_{PRB_i}$ is the total number of PRBs of the neighboring cell i; $\xi_1$ and $\xi_2$ are coefficients, and the values of $\xi_1$ and $\xi_2$ are preset by the communication system.

According to the description in step 211, apparently, a terminal with a greater $P_{UE_k}^{MLB}$ has a higher handover priority.

212. According to the first reference value and the second reference value of the terminal that needs optimization processing, determine a third reference value, where the third reference value is used for representing the handover priority of the terminal when both the network handover performance indicator and the network load performance indicator deteriorate (that is, the network needs the handover priority of each terminal during both MRO optimization and MLB optimization).

213. Based on the strategy that a terminal with a greater third reference value has a higher priority, perform handover priority sorting on the terminals that need optimization, and determine the handover priority of each terminal.

An embodiment of the present invention provides a method for calculating the third reference value for reference, and as shown in Formula (4), the third reference value is marked as $P_{UE_k}$:

$$P_{UE_k} = \frac{(\lambda_1 + \lambda_2) P_{UE_k}^{MRO} + (\lambda_3 + \lambda_4) P_{UE_k}^{MLB}}{\lambda_1 + \lambda_2 + \lambda_3 + \lambda_4} \qquad (4)$$

in which $\lambda_1, \lambda_2, \lambda_3, \lambda_4$ are weight values, which may be set through prior experience or a simulation technology.

Obviously, according to the description in step 213, a terminal with a higher $P_{UE_k}$ value has a higher handover priority.

In addition, an embodiment of the present invention further provides a method for determining a handover priority of a terminal in the case that both the network handover performance indicator and the network load performance indicator are higher than corresponding preset values: according to Formula (1) provided in step 202, HOF and HPP can reflect the network handover performance indicator of the current cell, CDR and z can reflect the network load performance indicator of the current cell; if $\lambda_1 + \lambda_2 > \lambda_3 + \lambda_4$, a terminal with a higher first reference value $P_{UE_k}^{MRO}$ has a higher handover priority; and if $\lambda_1 + \lambda_2 < \lambda_3 + \lambda_4$, a terminal with a higher second reference value $P_{UE_k}^{MLB}$ has a higher handover priority.

214. The base station configures a handover parameter for the terminal that needs optimization processing according to the sorted handover priority result, and based on a configuration rule that a smaller handover parameter value is configured for a terminal with a higher handover priority.

Specifically, the base station may configure at least one parameter of a CIO parameter and a Hysteresis parameter for each terminal in sequence according to Formula (5) in the following.

$$\begin{cases} M_{i,UE1} > M_{0,UE1} + CIO_{UE1} + Hysteresis + HO_{offset} \\ M_{i,UE2} > M_{0,UE2} + CIO_{UE2} + Hysteresis + HO_{offset} \\ \quad \ldots \\ M_{i,UEk} > M_{0,UEk} + CIO_{UEk} + Hysteresis + HO_{offset}; \end{cases} \qquad (5)$$

in which, $M_{i,UEk}$ denotes an RSRP value of the neighboring cell measured by the terminal k, $M_{0,UEk}$ denotes an RSRP value of the serving cell 0 measured by the terminal k, $CIO_{UEk}$ denotes a handover offset when $UE_k$ is handed over from the serving cell 0 to the neighboring cell i, Hysteresis denotes a hysteresis amount of a measurement event A3 in a communication protocol, and HOoffset denotes an offset of the measurement event A3.

Optionally, while the CIO parameter and/or Hysteresis parameter according to Formula (5) is adjusted, the TTT parameter may be further adjusted to implement combined adjustment of the CIO parameter and TTT parameter of each terminal, or combined adjustment of the Hysteresis parameter and TTT parameter of each terminal.

In addition to the method for configuring a handover parameter for a terminal, an embodiment of the present invention further provides an optional solution to enhance the configuration efficiency in the process of configuring a handover parameter for a terminal, which is specifically as follows:

Set one or more thresholds according to a descending order of handover priorities.

According to the threshold, group the terminals that need optimization processing to obtain one or more terminal groups.

Based on a configuration rule that a smaller handover parameter value is configured for a terminal group with a higher handover priority, set a handover parameter for each terminal group.

215. The base station sends the handover parameter to the corresponding terminal, so that the terminal is handed over according to the handover parameter to complete optimization processing.

The method provided in the embodiment of the present invention for optimizing a radio network can recognize a terminal that needs optimization processing in the current cell, and according to a specific situation of each terminal causing that a network handover performance indicator and a network load performance indicator of the current cell deteriorate, configure a handover parameter for each terminal, so that a terminal that needs a handover is handed over to a neighboring cell for communication and a terminal that does not need a handover is kept in a source serving cell for communication, so as to avoid some unnecessary inter-cell handovers and avoid a waste of radio resources, and at the same time further enhance the quality of service of the current cell.

Embodiment 3

Figure 3:
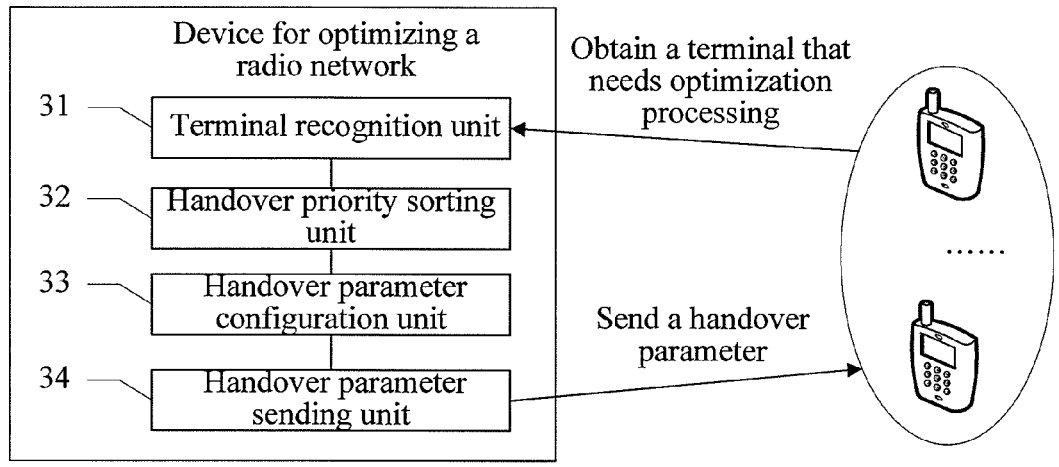
FIG. 3 to FIG. 12 are schematic structural views of a device for optimizing a radio network provided in Embodiment 3 of the present invention.

An embodiment of the present invention provides a device for optimizing a radio network, which is applicable to a base station and capable of implementing the method at the base station side in the method embodiment, and as shown in FIG. 3, the device includes:

a terminal recognition unit 31, adapted to recognize a terminal that needs optimization processing, where the terminal that needs optimization processing at least includes a terminal causing that a network handover performance indicator is higher than a corresponding preset value, or a terminal causing that a network load performance indicator is higher than a corresponding preset value;

a handover priority sorting unit 32, adapted to: according to a degree of influencing the network handover performance indicator or network load performance indicator by each of the terminal that needs optimization processing, perform handover priority sorting on the terminal that needs optimization processing to obtain a sorted handover priority result, where the terminal that has a greater degree of influencing the network handover performance indicator or network load performance indicator has a higher handover priority; and a handover parameter configuration unit 33, adapted to: according to the sorted handover priority result, and based on a configuration rule that a smaller handover parameter value is configured for a terminal with a higher handover priority, configure a handover parameter for the terminal that needs optimization processing; and a handover parameter sending unit 34, adapted to send the handover parameter to the corresponding terminal, so that the terminal is handed over according to the handover parameter to complete optimization processing.

Figure 4:
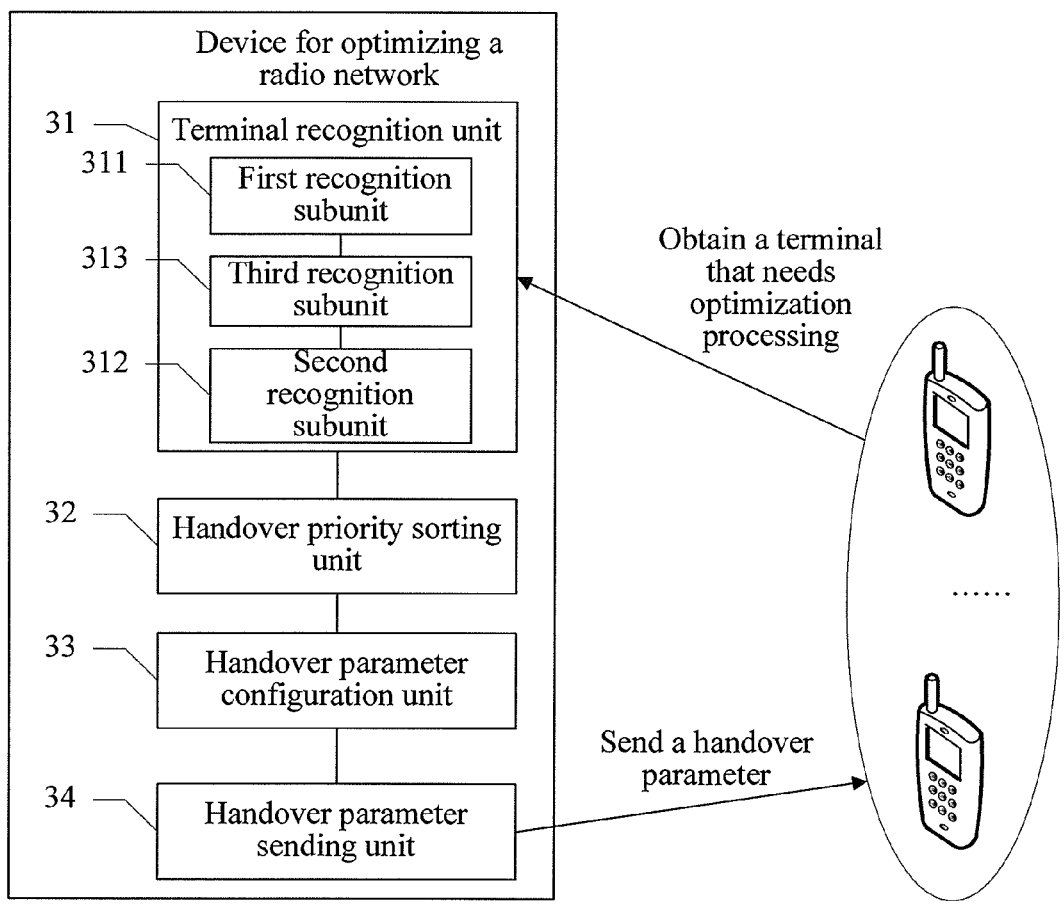

Furthermore, as shown in FIG. 4, the terminal recognition unit 31 includes a first recognition subunit 311, a second recognition subunit 312, and a third recognition subunit 313, in which, the first recognition subunit 311 is adapted to recognize all terminals in an overlapped area between a current cell and a neighboring cell, in which the terminals are seen as a set of terminals to be handed over;

the second recognition subunit 312 is adapted to count a network handover performance indicator and a network load performance indicator of a current cell within a preset count period; if the network handover performance indicator or the network load performance indicator of the current cell counted within the $n^{th}$ count period is higher than a corresponding preset threshold, count, with the $n^{th}$ count period being a start period, a network handover performance indicator and a network load performance indicator of a current cell within m consecutive count periods; in which n and m are preset values in the system, the preset values are variable; and m and n are positive integers; when the network handover performance indicator or the network load performance indicator of the current cell counted within the m consecutive count periods is higher than a corresponding preset threshold, choose at least one count period, and within the chosen count period, recognize, from the terminals of the current cell, a terminal causing that the network handover performance indicator or network load performance indicator is higher than the corresponding preset threshold, where termials that are recognized are seen as a set of terminals to be matched; and the third recognition subunit 313 is adapted to determine an intersection of the set of terminals to be handed over determined by the first recognition subunit and the set of terminals to be matched determined by the second recognition subunit, to obtain terminals that need optimization processing.

Figure 5:
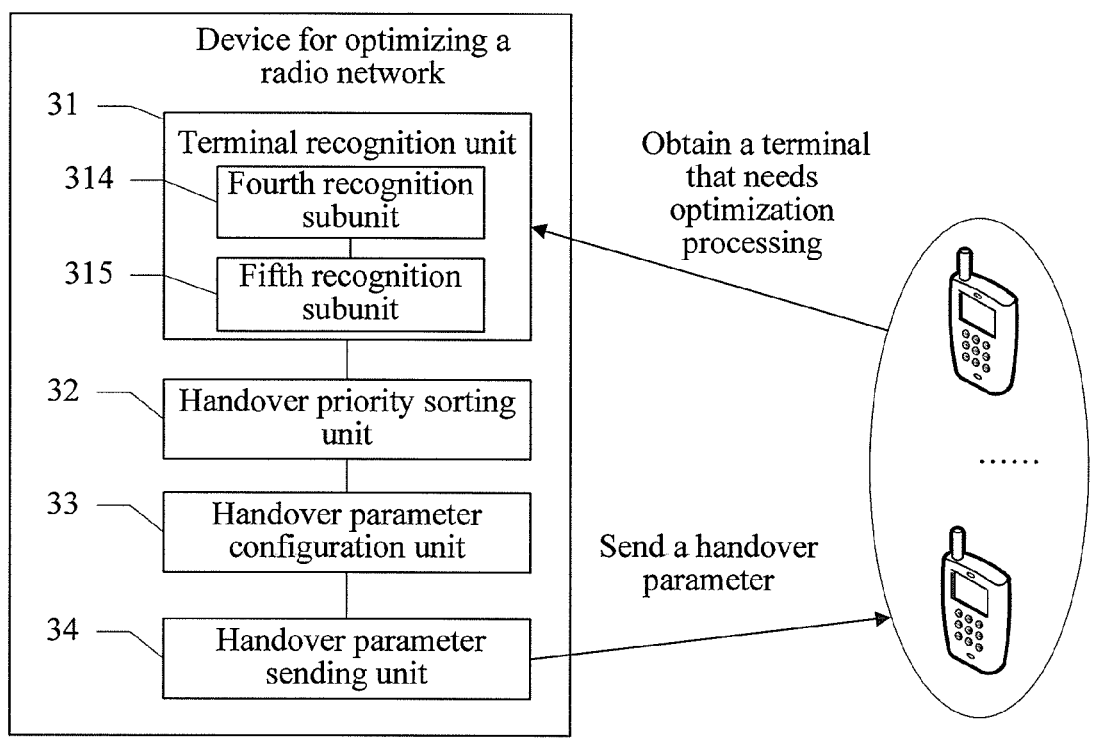

Optionally, according to the device shown in FIG. 3, furthermore, as shown in FIG. 5, the terminal recognition unit 31 includes: a fourth recognition subunit 314 and a fifth recognition subunit 315; in which, the fourth recognition subunit 314 is adapted to recognize all terminals in an overlapped area between a current cell and a neighboring cell, in which the terminals are seen as a set of terminals to be handed over; and the fifth recognition subunit 315 is adapted to count a network handover performance indicator and a network load performance indicator of a current cell within a preset count period; if the network handover performance indicator or network load performance indicator of the current cell counted within the $n^{th}$ count period is higher than the corresponding preset threshold, count, with the $n^{th}$ count period being a start period, a network handover performance indicator and a network load performance indicator of a current cell within m consecutive count periods, in which n and m are preset values in the system, the preset values are variable; and m and n are positive integers; when the network handover performance indicator or network load performance indicator counted within the m consecutive count periods is higher than the corresponding preset threshold, choose at least one count period, and within the chosen count period, recognize, from the set of terminals to be handed over determined by the fourth recognition subunit, a terminal causing that the network handover performance indicator or network load performance indicator is higher than the corresponding preset threshold, as a terminal that needs optimization processing.

On one hand, in the device shown in FIG. 4, the second recognition subunit 312 is specifically adapted to: when the network handover performance indicator is higher than the corresponding preset threshold, recognize a terminal on which a handover problem occurs in the current cell according to signaling count information of the network, and determine a set of terminals on which a handover problem occurs as a set of terminals to be matched.

In the device shown in FIG. 5, the fifth recognition subunit 315 is specifically adapted to: when the network handover performance indicator is higher than the corresponding preset threshold, recognize a terminal on which a handover problem occurs from the set of terminals to be handed over according to signaling count information of the network, and determine a set of terminals on which a handover problem occurs as a set of terminals to be matched.

The signaling count information of the network is obtained by reading and counting signaling capable of recognizing each handover problem of a corresponding terminal in a network and is used for representing or recording the handover problem that occurs during the handover of the terminal, and the handover problem includes an overdue handover, a premature handover, and a Ping-Pong handover.

Figure 6:
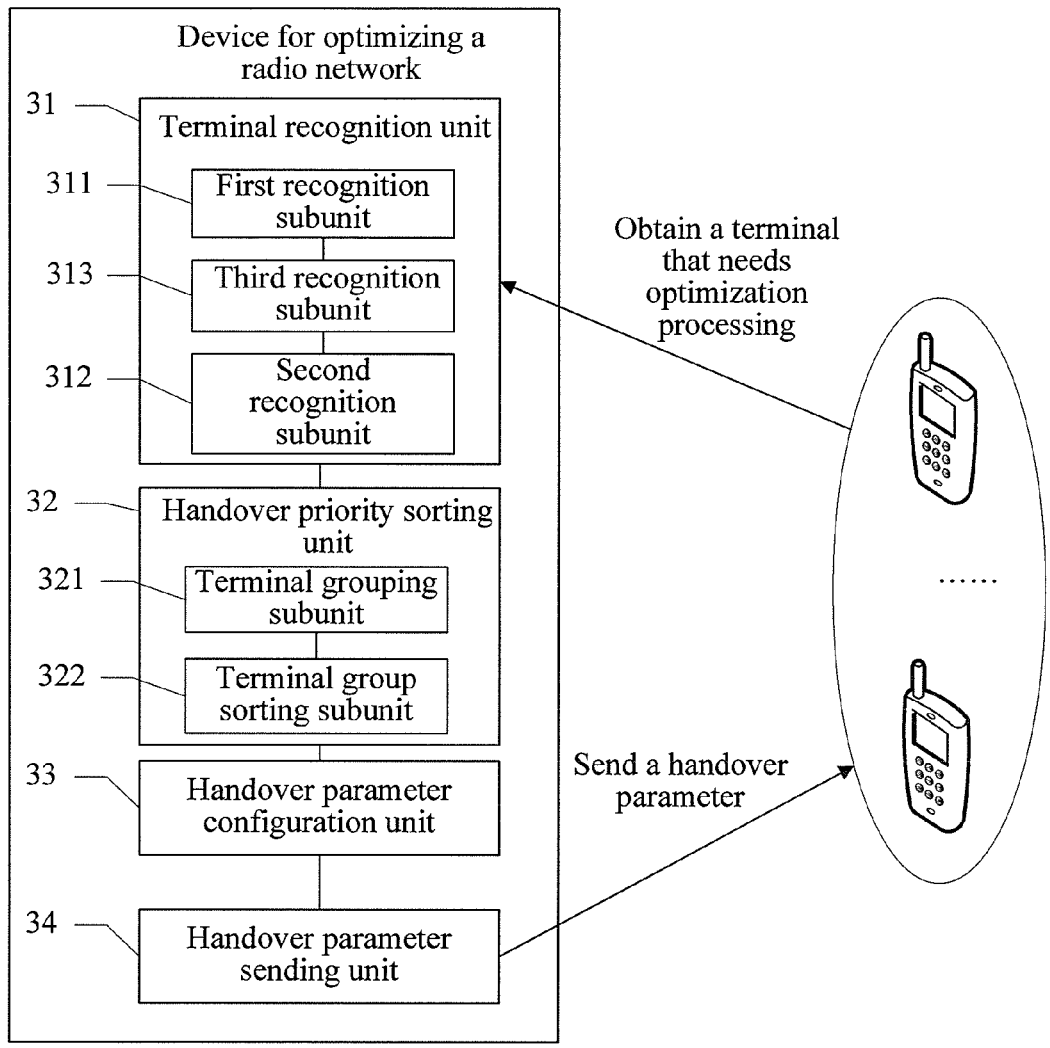

Furthermore, as shown in FIG. 6, the handover priority sorting unit 32 includes a terminal grouping subunit 321 and a terminal group sorting subunit 322, in which, the terminal grouping subunit 321 is adapted to group determined overdue handover terminals as an overdue handover terminal group, group determined premature handover terminals as a premature handover terminal group, and group determined Ping-Pong handover terminals as a Ping-Pong handover terminal group; and the terminal group sorting subunit 322 is adapted to set the priority of the overdue handover terminal group higher than the priorities of the premature handover terminal group and the Ping-Pong handover terminal group, and set the priority of the premature handover terminal group higher than the priority of the Ping-Pong handover terminal group.

Figure 7:
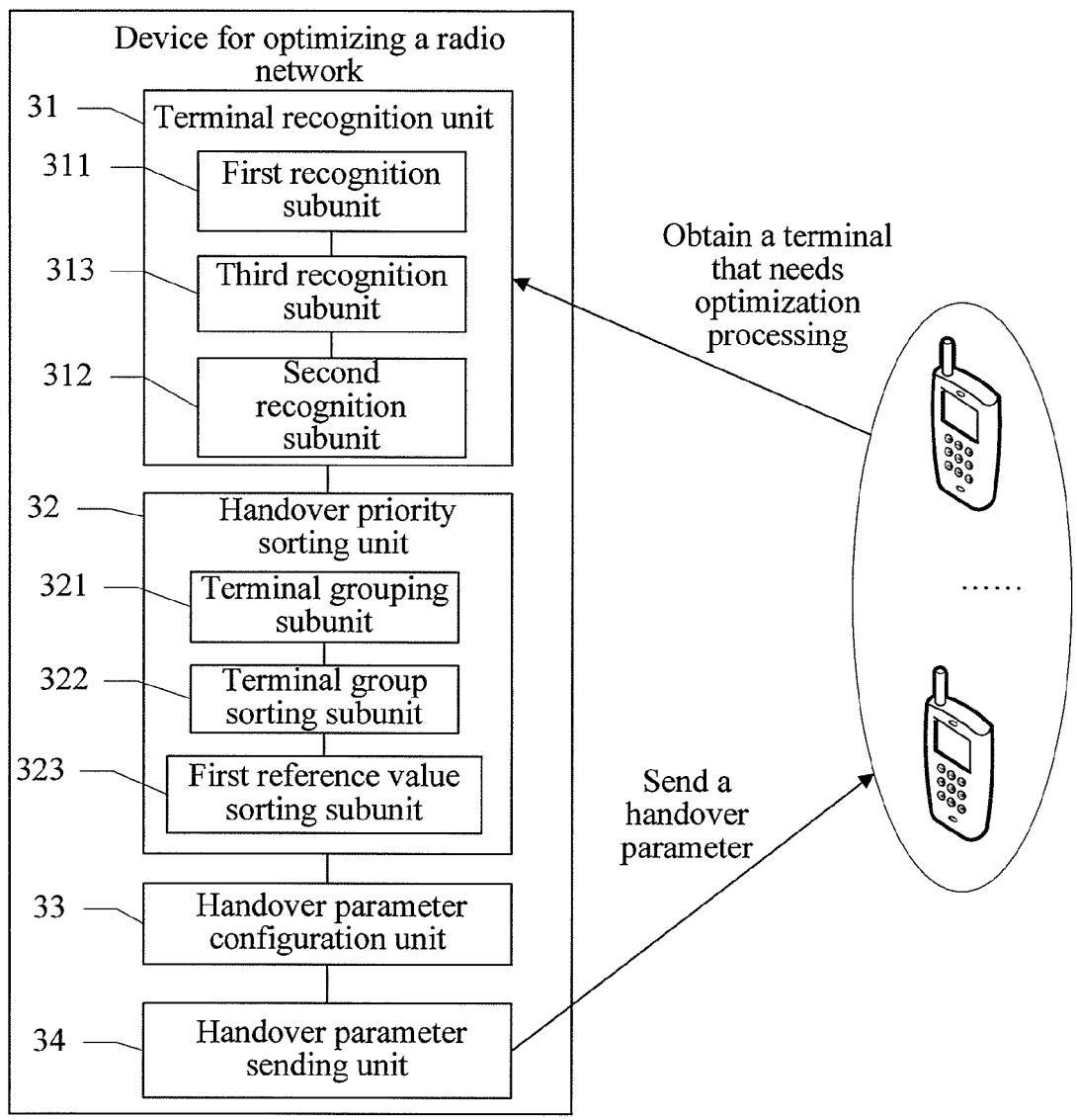

Furthermore, as shown in FIG. 7, the handover priority sorting unit 32 further includes a first reference value sorting subunit 323.

Exemplarily, for the terminals in the overdue handover terminal group, the first reference value sorting subunit 323 is specifically adapted to: according to the number of times that an overdue handover occurs on each terminal within a chosen count period and a ΔRSRP difference value, which is measured by each terminal, between the reference signal receiving power RSRP value of the current cell and the RSRP value of a neighboring cell, determine a first reference value of each terminal, where the first reference value is used for representing the handover priority of a terminal when only the network handover performance indicator deteriorates; and based on the strategy that a terminal with a greater first reference value has a higher priority, further sort terminals in the overdue handover terminal group, and determine handover priorities of terminals in the overdue handover terminal group.

For the terminals in the premature handover terminal group, the first reference value sorting subunit 323 is specifically adapted to: according to the number of times that a premature handover occurs on each terminal within a chosen count period, and a ΔRSRP difference value, measured by each terminal, between a reference signal receiving power RSRP value of a current cell and an RSRP value of a neighboring cell, determine a first reference value of each terminal, where the first reference value is used for representing the handover priority of the terminal when only the network handover performance indicator deteriorates, and based on the strategy that a terminal with a greater first reference value has a higher priority, further sort the terminals in the premature handover terminal group, and determine the handover priorities of terminals in the premature handover terminal group.

For the terminals in the Ping-Pong handover terminal group, the first reference value sorting subunit 323 is specifically adapted to: according to the number of times that a Ping-Pong handover occurs on each terminal within a chosen count period, and a ΔRSRP difference value, which is measured by each terminal, between a reference signal receiving power RSRP value of a current cell and an RSRP value of a neighboring cell, determine a first reference value of each terminal, where the first reference value is used for representing the handover priority of the terminal when only the network handover performance indicator deteriorates, and based on the strategy that a terminal with a greater first reference value has a higher priority, further sort the terminals in the Ping-Pong handover terminal group, and determine the handover priorities of terminals in the Ping-Pong handover terminal group.

A terminal on which a handover problem occurs more times has a greater corresponding first reference value and a higher handover priority.

On the other hand, in the device shown in FIG. 4, the second recognition subunit 312 is specifically adapted to: when the network load performance indicator is higher than the corresponding preset threshold, count, within the chosen count period, the number of physical resource blocks PRBs occupied by each terminal within the current cell; based on a descending order of the occupied number of PRBs, select terminals from the terminals that need optimization processing in sequence and label the terminals that are selected, until the total number of PRBs occupied by the labeled terminals reaches the highest value within a preset range of the number of PRBs, and use the labeled terminals as a set of terminals to be matched.

In the device shown in FIG. 5, the fifth recognition subunit 315 is specifically adapted to: when the network load performance indicator is higher than the corresponding preset threshold, count, within the chosen count period, the number of physical resource blocks PRBs occupied by each terminal in the set of terminals to be handed over; based on a descending order of the occupied number of PRBs, select terminals from the terminals that need optimization processing in sequence and label the terminals that are selected, until the total number of PRBs occupied by the labeled terminals reaches the highest value within a preset range of the number of PRBs, and use the labeled terminals as a set of terminals to be matched.

Figure 8:
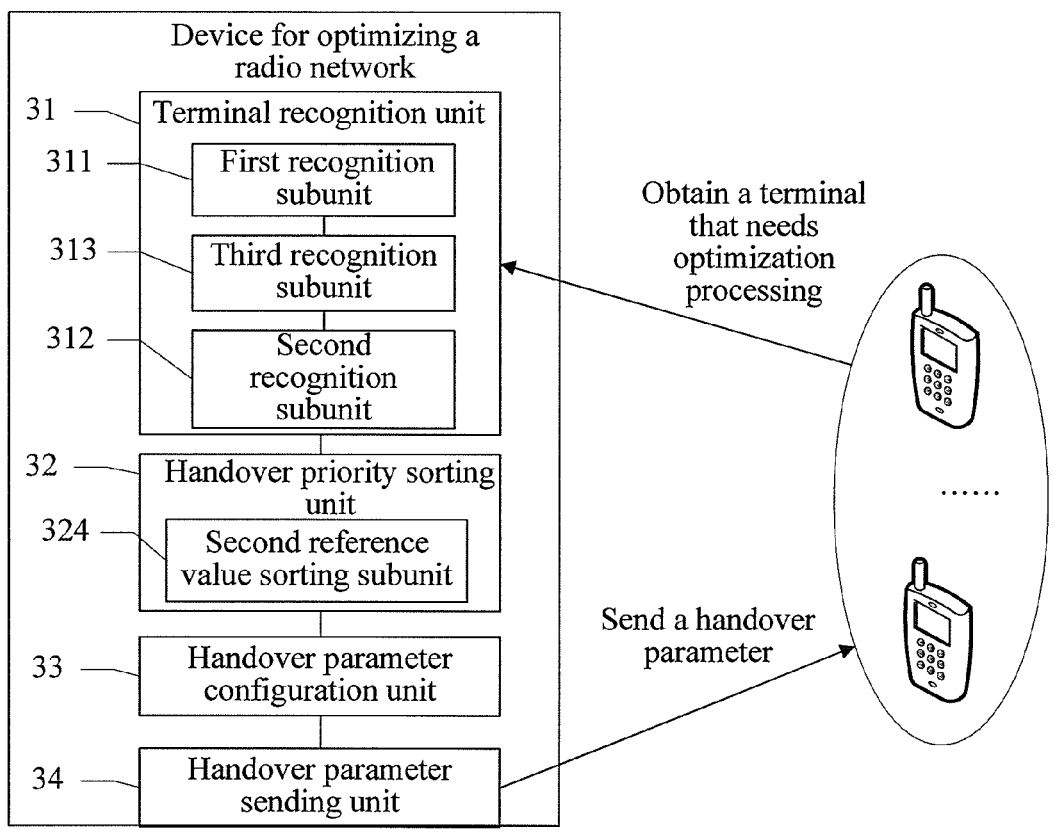

Furthermore, as shown in FIG. 8, the handover priority sorting unit 32 includes a second reference value sorting subunit 324, adapted to: within a chosen count period and according to the number of PRBs occupied by the terminal that needs optimization in a serving cell, the total number of PRBs of the serving cell, the number of PRBs needed for a handover to a neighboring cell, and the total number of PRBs of the neighboring cell of the handover, determine a second reference value of each terminal, where the second reference value is used for representing the handover priority of the terminal when only the network load performance indicator deteriorates; and based on the strategy that a terminal with a greater second reference value has a higher priority, perform handover priority sorting on the terminals that need optimization, and determine the handover priority of each terminal.

Figure 9:
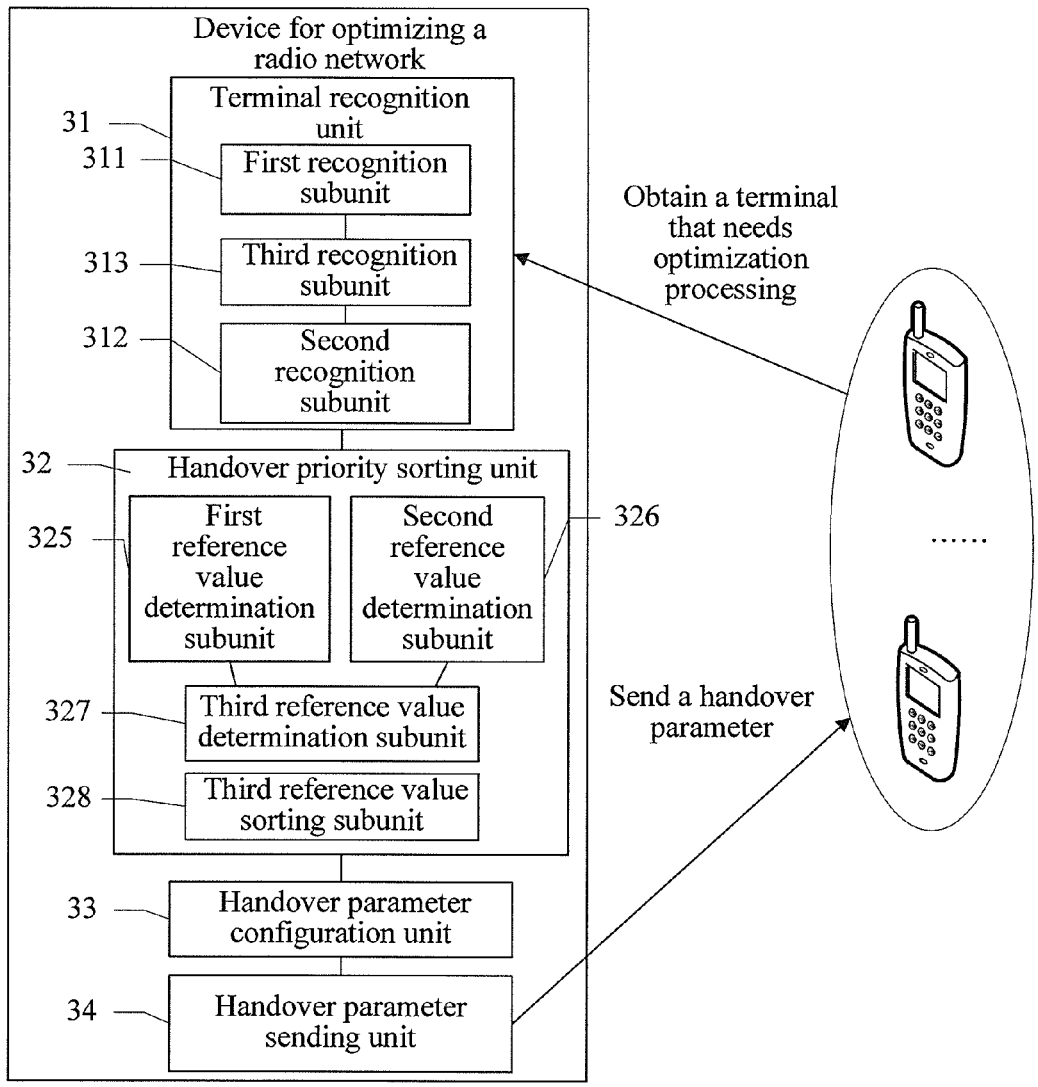

On yet another hand, as shown in FIG. 9, the handover priority sorting unit 32 includes a first reference value determination subunit 325, a second reference value determination subunit 326, a third reference value determination subunit 327, and a third reference value sorting subunit 328; in which, the first reference value determination subunit 325 is adapted to: when both the network handover performance indicator and network load performance indicator are higher than corresponding preset values, according to the number of times that a handover problem occurs on each terminal within a chosen count period, and a RSRP difference value, which is measured by each terminal, between a reference signal receiving power RSRP value of a current cell and an RSRP value of a neighboring cell, determine a first reference value of each terminal, where the first reference value is used for representing the handover priority of the terminal when only the network handover performance indicator deteriorates;

the second reference value determination subunit 326 is adapted to: when both the network handover performance indicator and the network load performance indicator are higher than corresponding preset values, within a chosen count period and according to the number of PRBs occupied by the terminal that needs optimization in a serving cell, the total number of PRBs of the serving cell, the number of PRBs required for a handover to a neighboring cell, and the total number of PRBs of the neighboring cell of the handover, determine a second reference value of each terminal, where the second reference value is used for representing the handover priority of the terminal when only the network load performance indicator deteriorates;

the third reference value determination subunit 327 is adapted to: according to the first reference value and the second reference value of the terminal that needs optimization processing, determine a third reference value, where the third reference value is used for representing the handover priority of the terminal when both the network handover performance indicator and the network load performance indicator deteriorate; and the third reference value sorting subunit 328 is adapted to: based on the strategy that a terminal with a greater third reference value has a higher priority, perform handover priority sorting on the terminals that need optimization, and determine the handover priority of each terminal.

Figure 10:
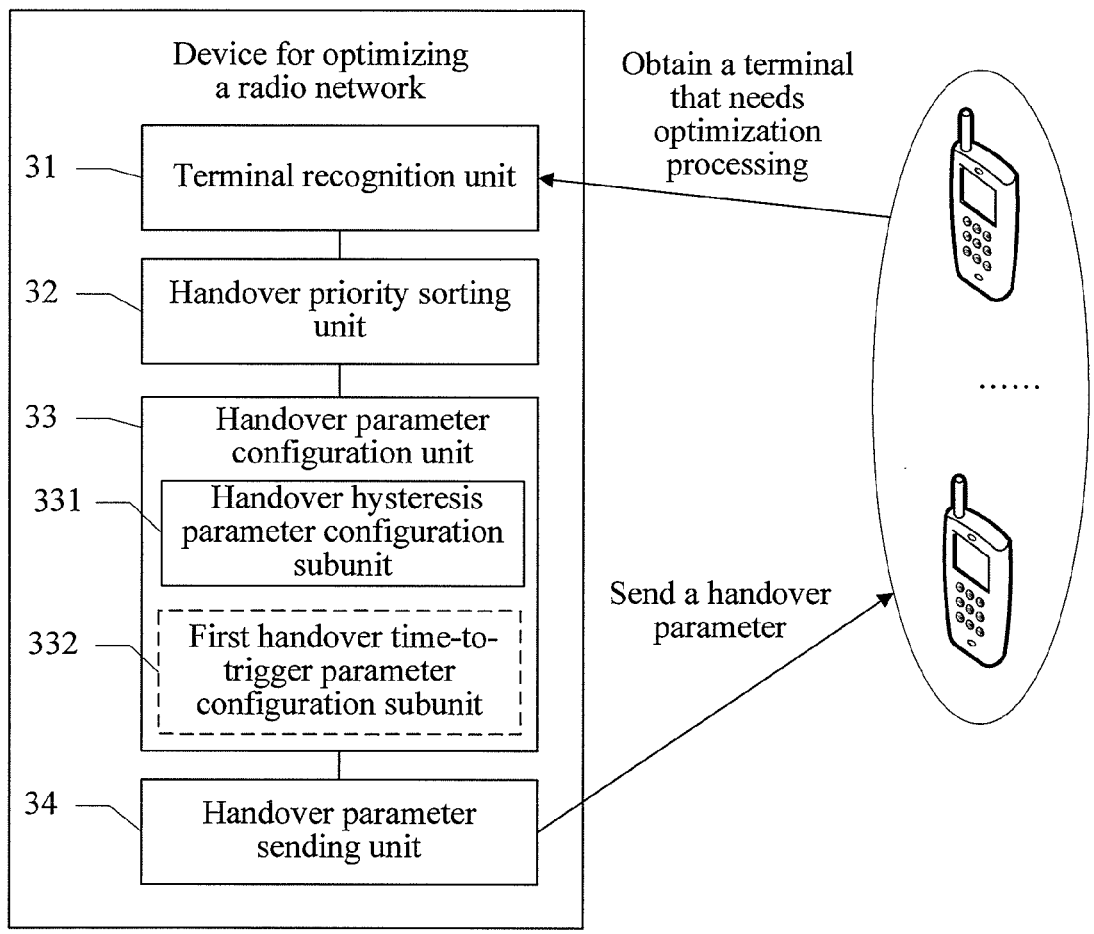

On the basis of the device shown in any one of FIG. 3 to FIG. 9, furthermore, as shown in FIG. 10, the handover parameter configuration unit 33 includes:

a handover offset parameter configuration subunit 331, adapted to: based on the following formula, configure a handover offset CIO parameter for each terminal;

$$\begin{cases} M_{i,UE1} > M_{0,UE1} + CIO_{UE1} + Hysteresis + HOoffset \\ M_{i,UE2} > M_{0,UE2} + CIO_{UE2} + Hysteresis + HOoffset \\ \ldots \\ M_{i,UEk} > M_{0,UEk} + CIO_{UEk} + Hysteresis + HOoffset; \end{cases}$$

in which $UE_k$ denotes a terminal k, $M_{i,UEk}$ denotes an RSRP value of a neighboring cell i measured by $UE_k$, $M_{0,UEk}$ denotes an RSRP value of a serving cell 0 measured by $UE_k$, $CIO_{UEk}$ denotes a handover offset when $UE_k$ is handed over from the serving cell 0 to the neighboring cell i, Hysteresis denotes a hysteresis amount of a measurement event A3 in the communication protocol, and HOoffset denotes an offset of the measurement event A3.

Specifically, when $UE_k$ has a higher handover priority, the handover offset parameter configuration subunit configures a smaller CIO parameter value for $UE_k$.

Optionally, as shown by the dotted line portion in FIG. 10, the handover parameter configuration unit 33 further includes:

a first handover time-to-trigger parameter configuration subunit 332, adapted to: in the case of adjusting a CIO parameter, based on a configuration rule that a smaller handover parameter value is configured for a terminal with a higher handover priority, adjust a handover time-to-trigger TTT parameter of the terminal to implement combined adjustment of the CIO parameter and the TTT parameter of each terminal.

Figure 11:
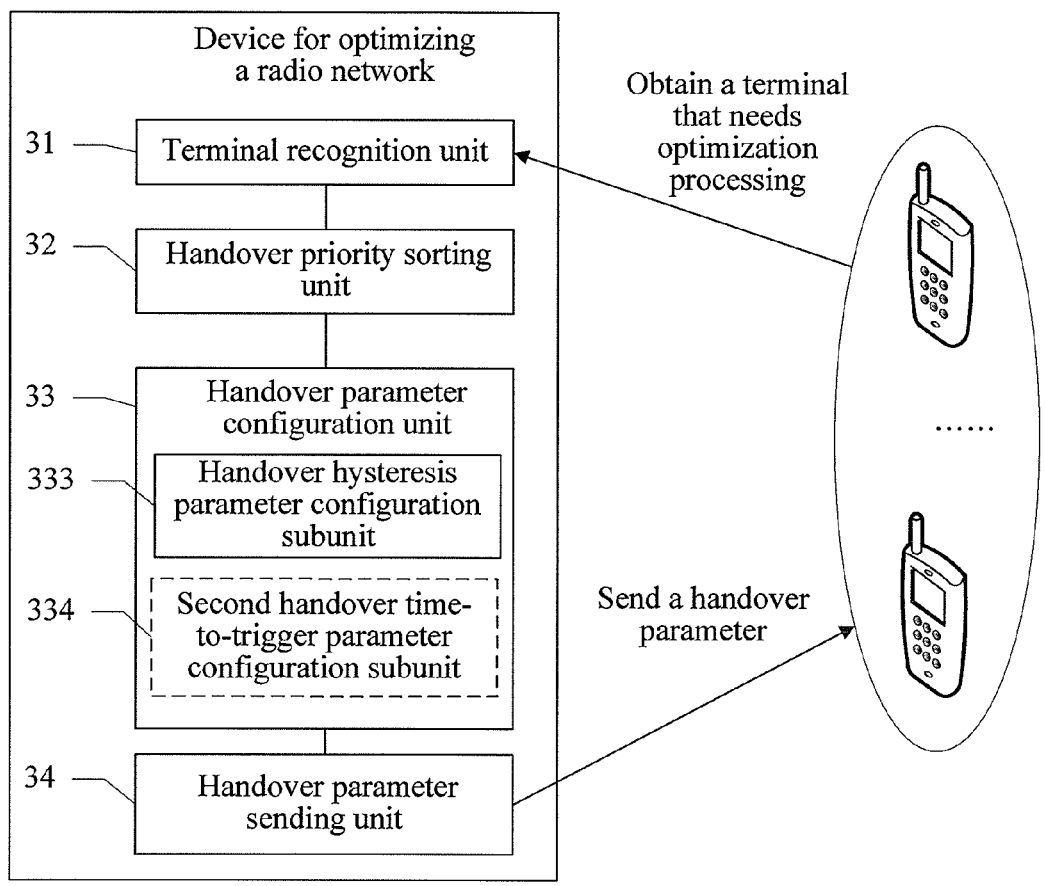

On the basis of the device shown in any one of FIG. 3 to FIG. 9, furthermore, as shown in FIG. 11, the handover parameter configuration unit 33 includes:

a handover hysteresis parameter configuration subunit 333, adapted to configure a Hysteresis parameter for each terminal based on the following formula;

$$\begin{cases} M_{i,UE1} > M_{0,UE1} + CIO + Hysteresis_{UE1} + HOoffset \\ M_{i,UE2} > M_{0,UE2} + CIO + Hysteresis_{UE2} + HOoffset \\ \ldots \\ M_{i,UEk} > M_{0,UEk} + CIO + Hysteresis_{UEk} + HOoffset; \end{cases}$$

in which $UE_k$ denotes a terminal k, $M_{i,UEk}$ denotes an RSRP value of a neighboring cell i measured by $UE_k$, $M_{0,UEk}$ denotes an RSRP value of a serving cell 0 measured by $UE_k$, CIO denotes a handover offset when the terminal is handed over from the serving cell 0 to the neighboring cell i, $Hysteresis_{UEk}$ denotes a hysteresis amount of a measurement event A3 in the communication protocol, and HOoffset denotes an offset of the measurement event A3.

Specifically, when $UE_k$ has a higher handover priority, the handover hysteresis parameter configuration subunit configures a smaller Hysteresis parameter value for $UE_k$.

Optionally, as shown by the dotted line portion in FIG. 11, the handover parameter configuration unit 33 further includes:

a second handover time-to-trigger parameter configuration subunit 334, adapted to: in the case of adjusting a CIO parameter, based on a configuration rule that a smaller handover parameter value is configured for a terminal with a higher handover priority, adjust a handover time-to-trigger TTT parameter to implement combined adjustment of the Hysteresis parameter and the TTT parameter of each terminal.

Figure 12:
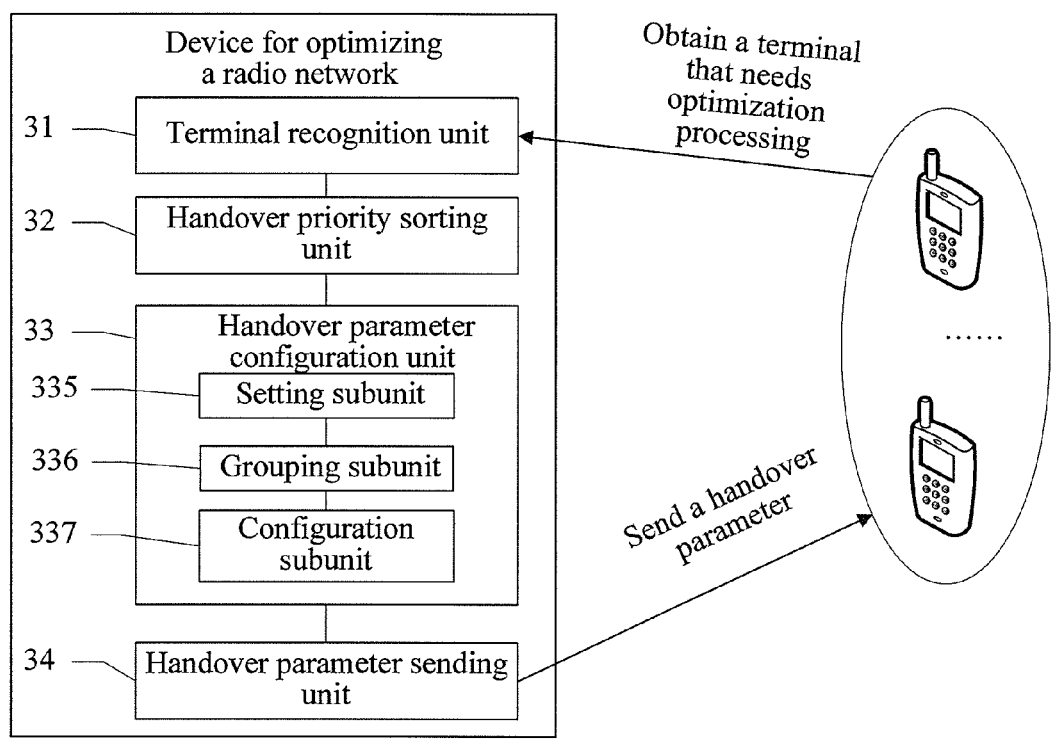

On the basis of the device shown in any one of FIG. 3 to FIG. 9, furthermore, as shown in FIG. 12, the handover parameter configuration unit 33 includes:

a setting subunit 335, adapted to set one or more thresholds according to a descending order of handover priority;

a grouping subunit 336, adapted to: according to the threshold, group the terminals that need optimization processing to obtain one or more terminal groups;

a configuration subunit 337, adapted to: based on a configuration rule that a smaller handover parameter value is configured for a terminal group with a higher handover priority, set a handover parameter for each terminal group.

It should be noted that the device for optimizing a radio network provided in the embodiment of the present invention may be deployed on a base station, or a base station controller, or a standalone server, which is not limited here.

The device for optimizing a radio network provided in an embodiment of the present invention is capable of recognizing a terminal that needs optimization processing within a current cell, and according to a specific situation of each terminal causing that a network handover performance indicator and a network load performance indicator of the current cell deteriorate, configuring a handover parameter for each terminal, so that a terminal that requires handover is handed over to a neighboring cell for communication and a terminal that does not need a handover is kept in a source serving cell for communication, so as to avoid some unnecessary inter-cell handovers and avoid a waste of radio resources, and at the same time further enhance the quality of service of the current cell.

An embodiment of the present invention further provides a communication system, which is capable of optimizing a radio network, and the communication system includes a base station and at least one terminal.

The base station includes the device for optimizing a radio network shown in FIG. 3 to FIG. 12, which is adapted to recognize a terminal that needs optimization processing, where the terminal that needs optimization processing at least includes a terminal causing that a network handover performance indicator is higher than a corresponding preset value, or a terminal causing that a network load performance indicator is higher than a corresponding preset value; according to a degree of influencing the network handover performance indicator or network load performance indicator by each of the terminal that needs optimization processing, perform handover priority sorting on the terminal that needs optimization processing to obtain a sorted handover priority result, where the terminal that has a greater degree of influence on the network handover performance indicator or network load performance indicator has a higher handover priority; according to the sorted handover priority result, and based on a configuration rule that a smaller handover parameter value is configured for a terminal with a higher handover priority, configure a handover parameter for the terminal that needs optimization processing; and send the handover parameter to the corresponding terminal, so that the terminal is handed over according to the handover parameter to complete optimization processing.

The terminal is adapted to receive the handover parameter configured by the base station and is handed over according to the handover parameter to complete optimization processing.

It should be noted that the embodiments provided in the present invention are mainly applicable to the LTE field; however, the method is applicable to other technical systems with a few modifications.

Through the above description of the embodiments, it is clear to persons skilled in the art that the present invention may be accomplished by software plus necessary universal hardware, and definitely may also be accomplished by hardware, but in many cases, the software implementation is preferred. Based on this, the technical solutions of the present invention or the part that makes contributions to the prior art may be substantially embodied in the form of a software product. The computer software product is stored in a readable storage medium, for example, a floppy disk, hard disk, or optical disk of the computer, and includes several instructions used to instruct computer equipment (for example, a personal computer, a server, or network equipment) to perform the methods according to the embodiments of the present invention.

In conclusion, the above are merely specific implementation methods of the present invention. However, the protection scope of the present invention is not limited thereto. Changes or replacements readily apparent to a person skilled in the prior art within the technical scope of the present invention should fall within the protection scope of the present invention. Therefore, the protection scope of the present invention is subject to the protection scope of the claims.

What is claimed is:

1. A method for optimizing a radio network, performed by a base station in a communication system, the method comprising:

determining, by the base station, whether a network handover performance indicator or a network load performance indicator of a first cell is higher than a corresponding threshold in an initial count period;

based on a determination that the network handover performance indicator or the network load performance indicator of the first cell is higher than the corresponding threshold in the initial count period, further determining, by the base station, whether the network handover performance indicator or the network load performance indicator of the first cell is higher than the corresponding threshold in a plurality of continuous count periods after the initial count period;

based on a determination that the network handover performance indicator or the network load performance indicator of the first cell is higher than the corresponding threshold in the plurality of continuous count periods after the initial count period, identifying, by the base station, a terminal that is located in an overlapped area of the first cell and a second cell and that contributes to cause the network handover performance indicator or the network load performance indicator of the first cell being higher than the corresponding threshold in one of the count periods after the initial count period;

obtaining, by the base station, a handover parameter for the terminal according to a degree of influence on the network handover performance indicator or the network load performance indicator of the first cell caused by the terminal; and sending, by the base station, the handover parameter to the terminal to control a handover process of the terminal.

2. A base station in a communication system, comprising:

at least one processor, configured to:

determine whether a network handover performance indicator or a network load performance indicator of a first cell is higher than a corresponding threshold in an initial count period;

based on a determination that the network handover performance indicator or the network load performance indicator of the first cell is higher than the corresponding threshold in the initial count period, further determine whether the network handover performance indicator or the network load performance indicator of the first cell is higher than the corresponding threshold in a plurality of continuous count periods after the initial count period;

based on a determination that the network handover performance indicator or the network load performance indicator of the first cell is higher than the corresponding threshold in the plurality of continuous count periods after the initial count period, identify a terminal that is located in an overlapped area of the first cell and a second cell and that contributes to cause the network handover performance indicator or the network load performance indicator of the first cell being higher than the corresponding threshold in one of the count periods after the initial count period; and obtain a handover parameter for the terminal according to a degree of influence on the network handover performance indicator or the network load performance indicator of the first cell caused by the terminal;

and a transmitter, configured to transmit the handover parameter to the terminal to control a handover process of the terminal.

3. A computer program product, comprising non-transitory computer readable medium storing program codes thereon for execution by a processor of a base station in a communication system, wherein the program codes comprise:

instructions for determining whether a network handover performance indicator or a network load performance indicator of a first cell is higher than a corresponding threshold in an initial count period;

instructions for, based on a determination that the network handover performance indicator or the network load performance indicator of the first cell is higher than the corresponding threshold in the initial count period, further determining whether the network handover performance indicator or the network load performance indicator of the first cell is higher than the corresponding threshold in a plurality of continuous count periods after the initial count period;

instructions for, based on a determination that the network handover performance indicator or the network load performance indicator of the first cell is higher than the corresponding threshold in the plurality of continuous count periods after the initial count period, identifying a terminal that is located in an overlapped area of the first cell and a second cell and that contributes to cause the network handover performance indicator or the network load performance indicator of the first cell being higher than the corresponding threshold in one of the count periods after the initial count period;

instructions for obtaining a handover parameter for the terminal according to a degree of influence on the network handover performance indicator or the network load performance indicator of the first cell caused by the terminal; and instructions for sending the handover parameter to the terminal to control a handover process of the terminal.

* * * * *

UNITED STATES PATENT AND TRADEMARK OFFICE
CERTIFICATE OF CORRECTION

| | | |
|---|---|---|
| PATENT NO. | : 9,036,602 B2 | Page 1 of 1 |
| APPLICATION NO. | : 13/718461 | |
| DATED | : May 19, 2015 | |
| INVENTOR(S) | : Jie Chen et al. | |

It is certified that error appears in the above-identified patent and that said Letters Patent is hereby corrected as shown below:

On title page, item (72), the city name of the inventor Andrian Beletchi should be Shenzhen (CN).

Signed and Sealed this
Twenty-seventh Day of October, 2015

Michelle K. Lee
*Director of the United States Patent and Trademark Office*